3,277,132
TIN(II) SALTS OF ORTHOPHOSPHORIC-MONO-($\beta$-AMINOETHANOL) ESTER
Samuel Wild, Schlossweg 80, Dornach, Switzerland, and Alfred Schuhmacher, Gundeldingerstrasse 71, Basel, Switzerland
No Drawing. Filed June 10, 1963, Ser. No. 286,494
Claims priority, application Switzerland, June 13, 1962, 7,053/62; Apr. 30, 1963, 5,399/63
24 Claims.  (Cl. 260—429.7)

As known, the aqueous solutions of ionogenic salts, that is to say of salts which electrolytically dissociate, of bivalent tin, hereinafter referred to as tin(II) salts, are unstable because they decompose hydrolytically. The hydrolytic decomposition of for instance aqueous solutions of tin(II) halides proceeds according to the equation:

I. $\quad SnX_2 + H_2O = Sn(OH)X + HX$ wherein X is a halogen atom, such as fluorine, chlorine, bromine or iodine.

It is also known that tin(II) hydroxyhalide compounds of the type Sn(OH)X, wherein X is a halogen atom, are difficulty soluble in water and usually soon precipitate, the solution becoming cloudy and a powdery sediment being gradually formed. At the same time an equivalent proportion of the corresponding hydrohalic acid is liberated. The progress of hydrolysis can be judged and quantitatively estimated by observation of the degree of turbidity and of the amount of sediment which has collected. Moreover, the quantity of the precipitate and of the hydrohalic acid formed can be determined by conventional methods.

Tin(II) sulphate, $SnSO_4$, tin(II) nitrate, $Sn(NO_3)_2$, tin(II) acetate and other salts hydrolytically decompose in analogous manner, i.e. by precipitating a basic salt and liberating the corresponding acid. Any small quantities of difficultly water-soluble compounds, such as tin(II)-hydrogen orthophosphate, $SnHPO_4$, and of particularly difficultly water-soluble compounds, such as tin-(II)-hydroxyfluoride, Sn(OH)F, tin(II)-hydroxychloride, Sn(OH)Cl, basic tin(II) sulphate, $SnO.SnSO_4$, basic tin(II) nitrate, $SnO.Sn(NO_3)_2$, tin(II) pyrophosphate, $Sn_2P_2O_7$ and others, to the extent they do enter into solution, are likewise subject to hydrolytic decomposition, the end products being stannous hydroxide and the corresponding acid.

The keeping properties of aqueous solutions of tin(II) salts—even within the limited halide group—vary considerably. They depend inter alia upon the kind of halogen and acid radicals, the concentration of the solution and its temperature. Generally speaking, their stability decreases with increasing dilution. Aqueous solutions of $SnI_2$ decompose practically instantaneously, whereas aqueous solutions containing 5% and over of $SnF_2$ may keep quite clear for hours and even several days without a trace of tin(II)-hydroxyfluoride being seen.

Nearly coincidently with their hydrolytic decomposition or afterwards another reaction takes place if oxygen or oxidising substances are present. This can be described by the formula II. $\quad 3SnX_2 + \frac{1}{2}O_2 + H_2O = SnX_4 + 2Sn(OH)X$ Some of the bivalent tin ions (stannous ions) are changed into tetravalent tin ions (stannic ions). As known the presence of tin(II) ions can be detected by the brownish black colour of their sulphide compound SnS, whereas the colour of the tin(IV) sulphide, $SnS_2$, is yellow.

The oxygen consumed in this oxidation reaction can be measured and this measurement then permits the mass turnover in the reaction to be judged. Moreover, by precipitation with hydrogen sulphide the proportion of SnS to $SnS_2$ can be determined and the oxygen turnover, i.e. the loss of tin(II) ions, calculated. However, oxidation can be prevented or reduced by excluding oxygen or by introducing suitable reducing agents and antioxidants.

Tin(II) salt solutions will be hereafter referred to as being unstable if the corresponding hydroxy compound is formed by hydrolysis. This can be recognised by the increasing turbidity of the solutions and/or by the formation of a sediment. Solutions will be referred to as stable or as having been stabilised if, having undergone a special treatment or otherwise, they exhibit neither turbidity nor form a precipitate in the course of long periods of time. Agents which cause an otherwise unstable solution to keep for long periods of time will hereinafter be referred to as stabilisers.

It is also advisable to avoid exposing the tin(II) salt solutions either to the action of oxygen or of other oxidising reagents or to prevent oxidation by taking other appropriate steps.

It is know that various reagents have a partial stabilising effect on aqueous tin(II) salt solutions inasmuch as they reduce the rate of hydrolytic decomposition. In some such salts, such as $SnF_2$, $SnCl_2$, $SnSO_4$ and so forth the fact that they are kept in the form of very highly concentrated solutions may already be sufficient to stabilise them or at least to delay their hydrolytic decomposition. However, the stability thus achieved and the delaying action on decomposition lasts for only fairly short times. A certain degree of stability, though likewise of limited duration, can also be achieved by adding diverse chemicals, such as sodium chloride, potassium chloride, sodium fluoride, magnesium silicofluoride, formaldehyde, or inorganic acids, such as HCl, $H_2SO_4$, $HNO_3$ etc., or organic acids, such as citric acid, ascorbic acid, gluconic acid and others.

The technological, pharmaceutical, medico-dental and other applications of tin(II) salts in aqueous solution have in the past been considerably impeded by the instability of these solutions. For instance, the application of aqueous tin(II) fluoride solutions as a mouth wash and dental preservative, notwithstanding the excellent inhibiting effect on caries of the undecomposed freshly prepared solutions, has been wholly defeated by the instability of the solutions even though decomposition could be temporarily delayed by the addition of one or more of the above mentioned reagents. In the case of stannous fluoride decomposition may lead to the partial or complete loss of efficacy of the preparation and may even involve the formation of injurious decomposition products, such as of free hydrofluoric acid.

Surprisingly it has now been found that aqueous solutions of tin(II) salts, such as tin(II) halides and others, can be permanently stabilised if the water used for dissolving the tin(II) salts contains the phosphoric acid ester of $\beta$-ethanolamine.

The present invention therefore relates to a method of producing aqueous stable tin (II) salt soltuions, such as solutions of tin (II) halides, tin (II) sulphate etc., which consists in mixing the tin(II) salts and the ethanol-$\beta$-aminophosphate of formula 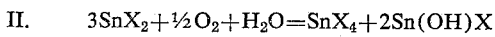 $C_2H_8NPO_4$ in aqueous solution. The quantity of the ester may vary within very wide limits. The permissible maximum quantity of the ester is determined exclusively by its solubility in water, whereas the permissible minimum quantity is that quantity of the ester which will still ensure satisfactory stabilisation of the tin(II) salt solution. This minimum quantity, as will be later described, differs in the case of different tin(II) salts.

The phosphoric acid ester of β-ethanolamine, also known as ethanol - 2 - aminophosphate, orthophosphoric-mono-(β-aminoethanol)-ester or phosphoryl colamine, $C_2H_8NPO_4$, occurs in the human and in animal organisms and can be extracted from tissues. As known from the literature, it can be successfully synthesised by reacting phosphoric acid with monoethanolamine with the liberation of water, a good and pure yield being obtained. It may here be noted that even in relatively strong doses this ester has no toxic effects, a circumstance of particular importance in view of its possible use for stabilising aqueous mouth washes and dentifrices containing tin(II) fluoride. For instance, 0.2 g. of the ester per kg. weight of the body administered on several consecutive days either orally or parenterally are readily accepted without toxic or other undesirable secondary effect. Experimental quantities of up to 3 g. per kg. weight likewise produce no toxic symptoms whatever.

The action of the ethanol-β-aminophosphate, hereinafter briefly referred to as the ester, on the salts of bivalent tin gives rise to the formation of a complex compound which is frequently more difficultly soluble in water than the original reactants, and which can be precipitated from the aqueous solution, according to the particular reactant used, with alcohol or acetone or an alcohol-acetone mixture in the form of a rubbery grease-like substance or white crystals. The formation of the complex is slow and at room temperature it takes several hours to complete, whereas at elevated temperature it is quicker. For 1 mol of tin (II) salt, say a halide, sulphate or the like, one or more mols of the ester may be used. For instance, if the molar ratio of ester to tin(II) salt is 1:1 a complex compound will form which is stable in aqueous solution for several days. On the other hand, if the solution which it is intended to stabilise contains say 5 mols of the ester per mol of tin(II) fluoride, then the resultant solution is found to remain stable for months and even for years, no cloudiness or precipitated sediment appearing in the solution after several years storage.

The production and the precipitation of the complex-like compound of the tin(II) salt and the ester will be illustratively described in the case of tin(II) fluoride:

35.5 g. of the ester were dissolved in 212.5 g. of de-aerated distilled water and the solution was filtered, the greatest possible care being taken to exclude air. At the same time 7.8 g. of tin(II) fluoride were dissolved in 42.5 g. of deaerated distilled water and this solution was likewise filtered taking the greatest care to keep out air. The tin(II) fluoride solution was combined with the ester solution, mixed and allowed to stand for 5 days, again with the exclusion of air. The complex compound thus formed and dissolved in the water was precipitated by slowly running 340 g. of acetone into the solution, the compound appearing in the form of white crystals. If the acetone was added too rapidly, rubbery grease-like precipitates may result, but these also turn into the white crystalline form when allowed to stand. The crystals were filtered off and dried in a vacuum desiccator. The first acetone precipitation yielded 40.6 g. of crystals. By adding more acetone to the filtrate and allowing the same to stand for some time a small additional quantity of crystals could be obtained. In cold water the complex-like compound is difficultly soluble, in hot water its solubility is about 2%, whereas the solubility of tin(II) fluoride in cold water is about 30% and that of the ester about 20%.

For producing a stabilised tin(II) salt solution it is advisable first to dissolve the ester in water and then to add the tin(II) salt. If the procedure is reversed the dissolved tin(II) salt may be affected by hydrolysis. In the case of tin(II) salts which hydrolytically decompose more slowly the quantity of decomposed product is only small. If this minor loss is thought to be acceptable, then one of the following procedures may be adopted:

(a) First dissolve the ester and then the tin(II) salt, or
(b) First dissolve the tin(II) salt and then the ester, or
(c) Mix tin(II) salt and the ester in their dry form and dissolve the mixture in water, or
(d) Combine tin(II) salt, ester and water simultaneously.

The optimum conditions, such as the best quantitative proportions, for stabilising aqueous tin(II) salt solutions, such as tin(II) halides or sulphate etc., by means of the specified ester differ from salt to salt and are related to the specific properties of the salt, as will be shown in the following illustrative examples.

EXAMPLE A.—TIN(II) FLUORIDE, $SnF_2$

Aqueous solutions containing between 5 and 10% or more of $SnF_2$ remain clear for periods between several hours and a few days. On the other hand, aqueous solutions containing less than 1% $SnF_2$ decompose practically instantaneously in the manner that has been described.

The caries-inhibiting effect of tin(II) fluoride is known to depend upon the fluorine being able to act on the tooth enamel in the form of the free fluoride ion $F^-$, i.e. in aqueous solution. Only when present in this form can it cooperate with the dental enamel and reduce the liability of the tooth to suffer from caries. The lack of stability of aqueous $SnF_2$ solutions and the resultant chemical and physical changes prevent such solutions from being usefully employed in dentifrices, mouth washes, dental impregnating solutions and so forth, because part of the fluorine is precipitated by hydrolytic decomposition within a very short time, according to Equation I, in the form of the difficultly soluble tin(II) hydroxyfluoride which does not fulfil the above mentioned basic condition. Another equivalent proportion of the fluorine is used up for the simultaneous formation of hydrofluoric acid which, because of its lower degree of dissociation, is likewise less effective than the original highly dissociated $SnF_2$. Moreover, the presence of hydrogen fluoride in dentifrices is not desirable because of its adverse effect on the gums. An effective stabiliser for the contemplated purpose should therefore satisfy the requirement of being able to keep the fluorine in the form of fluoride ions and the tin in the form of tin(II) ions in the solution permanently in equilibrium so that, on the one hand, the fluorine will remain permanently available in its active ion form and, on the other hand, the formation of free hydrofluoric acid will be suppressed.

In the course of extensive experimentation it was found that the specified ester if appropriately used completely satisfies this condition and that aqueous solutions of $SnF_2$ and other stannous compounds can be successfully stabilised in the manner required with the aid of the phosphoric acid ester of β-ethanolamine. For example, if 0.4 g. of tin(II) fluoride are dissolved in a solution of 2.5 g. of the ester in 97.1 g. of water, then to all intents and purposes the resultant solution will keep indefinitely without growing turbid, without precipitating or revealing any other signs of decomposition. The same applies to solutions prepared by simultaneously introducing the tin(II) salt and the ester (which should both be pure and as such give clear solutions) in crystalline and/or pulverulent form into the solvent water or by dissolving them in water after having first mixed then together in the dry state.

For handling $SnF_2$ solutions it is nowadays the practice to use vessels made of polythene, Teflon or the like because even very slight traces of free hydrofluoric acid attack glass by visibly etching its surface, causing parts of the glass to enter the solutions where they initiate or accelerate the ensuing decomposition. For this reason the tin(II) fluoride should be substantially free from impurities and contain no free hydrofluoric acid.

Exclusion of oxygen by conventional physical and/or chemical methods will not only ensure that the presence of the ester will accomplish the desired stabilisation but will also prevent oxidation of the tin(II) ions to tin(IV) ions or tin(IV) compounds. Aqueous tin(II) fluoride solutions which have been stablised by the proposed method do not attack glass—unlike analogous $SnF_2$ solutions which do not contain the ester—and they can therefore be kept under airtight seals in glass vessels for many years without any change affecting the solution itself or the glass. This interesting fact, bearing in mind the well-known sensitivity of clear glass to attack by the smallest trace of hydrofluoric acid, provides further proof of the complete absence of hydrofluoric acid in a stabilised aqueous $SnF_2$ solution or preparation containing such a solution.

The above example also proves that in a tooth paste containing tin(II) fluoride which has been prepared according to the invention there is no reduction in the available caries-inhibiting fluoride content, even when stored for long periods. It is therefore now possible for the first time to produce a dentifrice containing tin(II) fluoride which retains its efficacy, and which is based on as low as possible a fluoride content which is toxicologically quite unobjectionable but nevertheless sufficient for the suppression of caries.

The production of the complex-like compound of ester and tin(II) fluoride may proceed as follows:

35.5 g. of the ester were dissolved in 212.5 g. of deaerated distilled water and the solution was filtered, the greatest possible care being taken to exclude air. At the same time 7.8 g. of tin(II) fluoride were dissolved in 42.5 g. of deaerated distilled water and this solution was likewise filtered taking the greatest care to keep out air. The tin(II) fluoride solution was combined with the ester solution, mixed and allowed to stand for 5 days, again with the exclusion of air. The complex compound thus formed and dissolved in the water was precipitated by slowly running 340 g. of acetone into the solution, the compound appearing in the form of white crystals. If the acetone was added too rapidly, rubbery grease-like precipitates may result, but these also turned into the crystalline form when allowed to stand.

The crystals are filtered off and dried in a vacuum desiccator. After a first precipitation by means of acetone 40.6 grams of crystals are obtained. By adding a further quantity of acetone to the filtrate a further small amount of crystals can be recovered.

The complex-like compound is difficultly soluble in cold water and soluble in hot water only in a proportion of about 2%. The melting point is blurred at about 225° C.

EXAMPLE B.—TIN(II) CHLORIDE, $SnCl_2$ or $SnCl_2.2H_2O$

As known, an aqueous tin(II) chloride solution decomposes extremely quickly. For instance, solutions containing 0.1% to over 60% of this salt precipitate massive quantities of basic hydroxychloride in the course of only a few seconds to a few minutes and before the weighed quantity of salt has been fully dissolved.

When dissolving $SnCl_2.2H_2O$ in water which already contains the selected quantity of the phosphoric acid ester of β-ethanolamine in solution, intense hydrolysis first causes some turbidity owing to the precipitation of small amounts of basic hydroxychloride which occurs before the stabilizer has had time to take effect. However, the stabilizing effect of the ester immediately tells and prevents further clouding of the solution, so that in the end only very minor amounts of precipitate form. By using an inert filtration aid, such as very finely divided silica or the like, the cloudiness caused by the precipitation can be removed. The filtrate consisting of the stabilised tin(II) chloride solution then remains clear, provided at least 3 molecules of the ester have been introduced for each molecule of $SnCl_2$ and oxidative effects are suppressed by conventional means.

The ratio of stabiliser to tin(II) chloride and the content of the complex which forms can be varied considerably and adapted to specific requirements. Stabilised aqueous tin(II) chloride solutions may be used as reducing agents in analytical and preparative chemistry, as an antioxidant in the chemistry of greases and lubricants, in the paper making industry, for loading silk in the textile industry, in the metallurgical industry for galvanising, possibly in dermatological pharmaceutics and so forth.

EXAMPLE C.—TIN(II) BROMIDE, $SnBr_2$

When dissolved in water tin(II) bromide immediately gives rise to a massive precipitate of off-white tin(II) hydroxybromide, Sn(OH)Br, in addition to the formation of an equivalent quantity of highly dissociated hydrobromic acid. In order to prepare for instance a 2.78% stabilised aqueous $SnBr_2$ solution a possible procedure is to dissolve the phosphoric acid ester of β-ethanolamine in water and to add tin(II) bromide to this solution, the ester quantity being so chosen that the quantitative molar ratio of bromide to ester is 1:1. When the $SnBr_2$ is added to the aqueous solution slight clouding first occurs, as in the case of the corresponding chloride, but this can also be removed by filtration with colloidal silica. The filtrate which is a stabilised aqueous tin(II) bromide solution remains stable for a practically unlimited period provided oxygen or other oxidising influences are excluded.

In principle, tin(II) bromide solutions can be used for the same purposes as the tin(II) chloride solutions.

EXAMPLE D.—TIN(II) IODIDE, $SnI_2$

As known, this salt dissolves very slowly in water and the small quantities which enter into the solution are hydrolytically decomposed immediately.

If it is desired to prepare a stabilised tin(II) iodide solution this can be done by proceeding as described in Example C. Before the stabilising action of the ester becomes effective a partial precipitate of whitish yellow hydroxyiodide compound will appear, coating the $SnI_2$ crystals which have not yet dissolved. The further solution of these crystals is therefore delayed. If this mixture is filtered clear, a filtrate will be obtained consisting of a stabilised dilute tin(II) iodide solution. This solution then remains permanently clear.

EXAMPLE E.—TIN(II) SULPHATE, $SnSO_4$

As known, $SnSO_4$ is hydrolytically decomposed in aqueous solution in an analogous reaction involving the precipitation of tin(II) hydroxysulphate and the formation of sulphuric acid. However, generally speaking, decomposition proceeds much more slowly than in the case of the above described three tin(II) halides, $SnCl_2$, $SnBr_2$ and $SnI_2$, but still much more rapidly than in the case of $SnF_2$ in analogous solutions.

Stabilised tin(II) sulphate solution can be prepared by dissolving the phosphoric acid ester of β-ethanolamine in water and adding the tin(II) sulphate to this solution, preferably in proportions suitably chosen for 4 mols of the ester to be present in respect of each mol of $SnSO_4$ in the final stabilised solution. If such a solution is kept so that oxygen and oxidising reagents cannot gain access it will last for an unlimited period of time.

The applications of stabilised aqueous tin(II) sulphate solutions may extend to the same fields as those of stabilised aqueous tin(II) chloride solutions.

The present invention also relates to preparations for the care of mouth and teeth which contain a tin(II) fluoride solution stabilised with the phosphoric acid ester of β-ethanolamine. The principal feature of preparations for the care of mouth and teeth according to the invention is their content of tin(II) fluoride and possibly of other fluorine compounds as active substances as well as of the phosphoric acid ester of β-ethanolamine as a stabiliser for the tin(II) fluoride, besides conventional diluents or thickeners, abradants, surface-active and aroma substances and possibly other additives.

This part of the invention will also be exemplified by several examples but it is understood that these are not intended to limit its scope. More particularly, the invention also provides for the possibility of replacing part of the tin(II) fluoride in the following examples by some other fluorine compound which is compatible with tin(II) fluoride and the phosphoric acid ester of β-ethanolamine.

*Example 1*

A dentifrice is prepared as follows: In a polythene vessel which can be sealed 18 g. of ethanol-β-aminophosphoric acid ester are dissolved in 78 g. of distilled deaerated water with the application of gentle heat. The solution is filtered and 4 g. of pure tin(II) fluoride are added and dissolved. The solution is then filtered again. All these operations are performed in a nitrogen atmosphere, atmospheric oxygen being carefully excluded. By working the stabilised solution into 900 g. of a foundation paste a caries-inhibiting dentifrice with an 0.4% $SnF_2$ content is obtained.

The foundation paste used for this purpose contains the conventional thickeners, such as cellulose ester, diluents, such as distilled water, polishing agents, such as aerosil, i.e. silica in finest subdivision, fossil flour, water-insoluble calcium pyrophosphate, water-insoluble sodium metahexaphosphate, talc, aroma and taste-correcting agents, such as mentholum, oleum menthae, oleum anisi, oleum gaultheriae, foaming agents, such as fatty alcohol polyglycol ether sulphate, triethanolamine salt and possibly other additives, such as glycerine, to prevent the paste from drying out, dulcifiers, such as saccharine, pigments, such as 307 Strawberry Red A Geigy, etc., all of which must be compatible with tin(II) fluoride and the ethanol-β-aminophosphoric acid ester and must not form insoluble fluorine compounds. The paste composition is preferably prepared in a partly evacuated chamber or in an inert gas atmosphere. The filling of the finished paste into tubes is preferably done in a protective nitrogen atmosphere. The tubes may conveniently consist of tin or of a suitable plastic material, such as polythene, polyvinyl chloride, Teflon, polystyrene and the like.

The above paste may for instance have the following composition:

|  | G. |
|---|---|
| Ethanol-β-aminophosphoric acid ester | 18 |
| Tin(II) fluoride | 4 |
| Methyl cellulose | 10 |
| Glycerine | 160 |
| Saccharine | 0.4 |
| Aroma substances | 3.6 |
| Polishing agents | 320 |
| Foaming agents | 4.0 |
| Water | 480 |
|  | 1000.0 |

By varying the quantity of $SnF_2$ any desired $SnF_2$ content can be obtained. Moreover, an arbitrary proportion of the $SnF_2$ may be replaced by one or more alternative fluorine compounds, such as magnesium fluorosilicate, $MgSiF_6$.

*Example 2*

By adding inorganic salts and formaldehyde to the paste the latter, in addition to its caries-inhibiting effect, may be simultaneously endowed with the known action of reducing the sensitivity of the surface of the tooth and of improving the health of the gums. This supplementary effect is merely illustratively mentioned as a reason for including further additives. However, these additives must be compatible with the tin(II) fluoride and the ethanol-β-aminophosphoric acid ester and they must not form insoluble fluorine compounds.

A paste of this kind may have the following composition:

|  | G. |
|---|---|
| Ethanol-β-aminophosphoric acid ester | 0.53 |
| Tin(II) fluoride ($SnF_2$) | 0.1175 |
| Magnesium fluorosilicate ($MgSiF_6 \cdot 6H_2O$) | 0.0675 |
| Sodium chloride (NaCl) | 1.21 |
| Sodium sulphate ($Na_2CO_4$) | 0.0675 |
| Potassium sulphate ($K_2SO_4$) | 0.0675 |
| Formaldehyde 38% by vol. | 0.34 |
| Methyl cellulose | 0.6 |
| Glycerine | 16.0 |
| Saccharine | 0.04 |
| Aroma substances | 0.4 |
| Polishing agents | 32.0 |
| Foaming agents | 0.4 |
| Water | 48.16 |
|  | 100.00 |

*Example 3*

A concentrate for a mouth wash is prepared as follows: 100 g. of the stabilised aqueous solution of ethanol-β-aminophosphoric acid ester and tin(II) fluoride described in Example 1 are mixed with 900 g. of a deaerated solution which in addition to distilled or deionised water contains alcohol and a perfume and possibly other additions, such as dulcifiers, surface-active agents, formaldehyde, disinfectants and deodorants, salts etc. All these components must be compatible with $SnF_2$ and the ester and they must not form insoluble fluorine compounds.

By varying the quantity of $SnF_2$ the $SnF_2$ content can be adjusted as desired.

Moreover, in the above example part of the $SnF_2$ may be replaced by one or more other fluorine compounds.

The preparation of the mouth wash concentrate is preferably performed in vessels and supplementary apparatus made of polythene in which the atmospheric oxygen is substantially displaced by nitrogen as a protective gas.

For sale the concentrate may be packed in polythene flasks or the like. If ½ to 1 g. of such a concentrate is added to half a glass full of warm water and stirred a caries-inhibiting mouth wash is obtained.

Such a mouth wash (mouth wash concentrate) may have the following composition:

|  | G. |
|---|---|
| Ethanol-β-aminophosphoric acid ester | 18 |
| Tin(II) fluoride | 4 |
| Glycerine | 60 |
| Saccharine | 0.4 |
| Aroma substances | 3.6 |
| Foaming agent | 4 |
| Water | 910 |
|  | 1000 |

*Example 4*

A dental impregnating solution is prepared as follows:

In a polythene vessel which can be sealed 9 g. of ethanol-β-aminophosphoric acid ester are dissolved in 89 g. of distilled or deionised deaerated water with the application of gentle heat. The solution is filtered and 2 g. of a pure tin(II) fluoride are added, followed by refiltration when the salt has dissolved. All operations are performed, with the maximum possible exclusion of atmospheric oxygen, in an inert gas atmosphere, such as a nitrogen atmosphere. The resultant solution is filled into tightly sealing polythene flasks or the like and any atmospheric oxygen above the surface of the liquid is displaced by nitrogen.

A solution of this kind can be applied by the dentist by painting the teeth of his patient with the undiluted impregnating solution containing the stabilised tin(II) fluoride once or twice a year, in special cases more frequently, using a suitable swab or by employing some other appropriate technique of application.

Example 5

Instead of preparing an impregnating solution as in Example 4, relatively concentrated impregnating pastes, creams or jellies can be prepared by analogous methods and by adding suitable thickeners and these preparations can be used for local application by the dentist.

(a) An impregnating solution of the above kind may have the following composition:

|  | G. |
|---|---|
| Ethanol-β-aminophosphoric acid ester | 9 |
| Tin(II) fluoride | 2 |
| Water | 89 |
|  | 100 |

(b) An alternative impregnating solution may have the following composition:

|  | G. |
|---|---|
| Ethanol-β-aminophosphoric acid ester | 9 |
| Tin(II) fluoride | 2 |
| Methyl cellulose | 1 |
| Water | 88 |
|  | 100 |

Example 6

Dry tin(II) fluoride preparations which will produce clear stable solutions when protected from air in distilled or deionised water, can be prepared as follows:

(a) A solution prepared as described in Example 1 of 18 g. of ethanol-β-aminophosphoric acid ester and 4 g. of tin(II) fluoride in 78 g. of water is evaporated until dry with the careful exclusion of atmospheric oxygen (for instance in an evacuated or nitrogen-filled desiccator). The dry residue is ground down to the desired grain size and is then ready for use.

(b) 818.2 g. of ethanol-β-aminophosphoric acid ester and 181.8 g. of pure tin(II) fluoride which will dissolve to form a clear solution are compounded in crystallised and/or pulverised dry form (possibly in a ball mill) until a homogeneous mixture of both components is obtained which is ready for use.

The described dry preparations, if stored dry in sealed vessels, keep for practically unlimited periods of time. In suitably modified form they can be used for the preparation of mouth washes, dentifrices and dental impregnants as described in Examples 1 to 5. In the case of Example 6b the formation of the complex compound of tin(II) salt and ester does not taken place until the dry preparation is combined with the water content of the final product. The stabilising effect in both cases is the same.

What we claim:

1. As a chemical entity, complex reaction product of tin(II) salt with orthophosphoric-mono-(β-aminoethanol)-ester, wherein all the tin is bivalent tin.

2. As a chemical entity, complex reaction product of tin(II) halide or tin(II) sulphate with orthophosphoric-mono-(β-aminoethanol)-ester, wherein all the tin is bivalent tin.

3. A method of producing complex reaction product of tin(II) salt with orthophosphoric-mono-(β-aminoethanol)-ester, wherein all the tin is bivalent tin, which comprises reacting tin(II) salt with orthophosphoric-mono-(β-aminoethanol)-ester in aqueous solution.

4. A method according to claim 3, wherein the tin(II) salt is tin(II) halide or tin(II) sulphate.

5. A method according to claim 4, wherein orthophosphoric-mono-(β-aminoethanol)-ester and tin(II) halide or tin(II) sulphate are dissolved separately in water, the two solutions combined, and the reaction product precipitated by means of a precipitant.

6. A method according to claim 5, performed with exclusion of air.

7. A method according to claim 4, wherein tin(II) or tin(II) sulphate is mixed dry with orthophosphoric-mono-(β-aminoethanol)-ester, the mixture then dissolved in water, and the reaction product precipitated with a precipitant.

8. A method according to claim 7, performed with exclusion of air.

9. A method according to claim 4, wherein orthophosphoric-mono-(β-aminoethanol)-ester is first dissolved in water, tin(II) halide or tin(II) sulphate is then added to the resultant aqueous solution, and the reaction product is precipitated with a precipitant.

10. A method according to claim 8, performed with exclusion of air.

11. A method according to claim 4, wherein tin(II) halide or tin(II) sulphate, orthophosphoric-mono-(β-aminoethanol)-ester and water are combined simultaneously and, after resultant dissolution, the reaction product is precipitated with a precipitant.

12. A method according to claim 11, performed with exclusion of air.

13. A method according to claim 4, wherein tin(II) halide or tin(II) sulphate is first dissolved in water, orthophosphoric-mono-(β-aminoethanol)-ester is then added to the obtained aqueous solution, and the reaction product is precipitated with a precipitant.

14. A method according to claim 13, performed in absence of air.

15. A method according to claim 4, wherein at least 1 mol of orthophosphoric-mono-(β-aminoethanol)-ester and 1 mol of tin(II) salt are reacted.

16. A method according to claim 15, wherein up to 4 mols of orthophosphoric-mono-(β-aminoethanol)-ester are reacted with 1 mol of tin(II) salt.

17. A method of stabilising tin(II) halide and tin(II) sulphate which comprises bringing the same into contact with orthophosphoric-mono-(β-aminoethanol)-ester in aqueous medium.

18. A method according to claim 17, performed in absence of air.

19. A method of stabilising tin(II) halide or tin(II) sulphate which comprises chemically combining the same with orthophosphoric-mono-(β-aminoethanol)-ester.

20. Tin(II) fluoride.orthophosphoric-mono-(β-aminoethanol)-ester.

21. Tin(II) chloride.orthophosphoric-mono-(β-aminoethanol)-ester.

22. Tin(II) bromide.orthophosphoric-mono-(β-aminoethanol)-ester.

23. Tin(II) iodide.orthophosphoric-mono-(β-aminoethanol)-ester.

24. Tin(II) sulfate.orthophosphoric-mono-(β-aminoethanol)-ester.

References Cited by the Examiner

UNITED STATES PATENTS

| 2,420,286 | 5/1947 | Lacey | 252—188.3 |
|---|---|---|---|
| 2,451,686 | 10/1948 | Moller | 252—188.3 |
| 2,702,777 | 2/1955 | Kerr | 167—53 |
| 2,922,738 | 1/1960 | McDermott | 167—22 |
| 2,946,725 | 7/1960 | Norris | 167—93 |
| 3,034,967 | 5/1962 | Apperson | 167—93 |
| 3,117,147 | 1/1964 | Langer | 260—429.7 |
| 3,122,576 | 2/1964 | Jason | 260—429.7 |

TOBIAS E. LEVOW, *Primary Examiner.*

FRANK CACCIAPAGLIA, JR., *Examiner.*

S. ROSEN, W. F. W. BELLAMY, *Assistant Examiners.*